United States Patent [19]

Coogan et al.

[11] Patent Number: 5,169,895
[45] Date of Patent: Dec. 8, 1992

[54] AQUEOUS DISPERSIONS OF POLYURETHANE

[75] Inventors: Richard G. Coogan, North Reading; Razmik Vartan-Boghossian, Belmont, both of Mass.

[73] Assignee: ICI Americas, Inc., Wilmington, Del.

[21] Appl. No.: 538,335

[22] Filed: Jun. 14, 1990

[30] Foreign Application Priority Data

Jun. 14, 1989 [GB] United Kingdom ................ 8913644

[51] Int. Cl.⁵ .............................................. C08G 18/10
[52] U.S. Cl. .................................... 524/591; 524/804; 524/839; 524/840
[58] Field of Search ................ 524/804, 839, 840, 591

[56] References Cited

U.S. PATENT DOCUMENTS 4,507,431 3/1985 Stutz et al. ........................... 524/840
4,927,876 5/1990 Coogan et al. ....................... 524/457

FOREIGN PATENT DOCUMENTS 0103174 4/1985 European Pat. Off. .
2822394 11/1978 Fed. Rep. of Germany .
3139966 4/1983 Fed. Rep. of Germany .
2222404 10/1974 France .

Primary Examiner—Maurice J. Welsh
Assistant Examiner—Rachel Johnson
Attorney, Agent, or Firm—Cushman, Darby & Cushman

[57] ABSTRACT

An aqueous dispersion of a water-dispersible polyurethane, said polyurethane comprising the reaction product of:
(a) a water-dispersible isocyanate-terminated polyurethane prepolymer having an NCO content of 2.1 to 10% by weight,
(b) an organic polyisocyanate having an average isocyanate functionality of 2.1 to 4.0, and
(c) an active hydrogen-containing chain extender.

9 Claims, No Drawings

AQUEOUS DISPERSIONS OF POLYURETHANE

This invention relates to aqueous dispersions and more particularly to aqueous polyurethane dispersions useful as coating compositions.

Aqueous polyurethane dispersions are well known and are used in the production of useful polyurethane products, for example coatings, films, adhesives and the like. Such dispersions are usually produced by dispersing a water-dispersible, isocyanate-terminated polyurethane prepolymer in an aqueous medium in conjunction with an active hydrogen containing chain extender such as a diamine.

The prepolymers used in the preparation of the dispersions are generally substantially linear, that is to say difunctional, and are typically obtained by reaching an excess of a diisocyanate with an isocyanate-reactive component comprising a polymeric diol in the presence of a reactive compound, for example a diol or diisocyanate, containing an ionic or nonionic hydrophilic group or site.

Attempts to introduce higher functionality into the dispersed polyurethanes have not been entirely successful. One method of increasing the functionality is to incorporate a triol or tetrol into the prepolymer and the use of such polyfunctional active hydrogen compounds in the preparation of ionic polyurethane dispersions has been described in U.S. Pat. No. 4,554,308. The amount of polyfunctionality that can be introduced in this way is limited by the tendency of the more highly cross-linked prepolymers to gel and to form large micelles when dispersed, resulting in poor, film formation.

Another method of introducing polyfunctionality is to use a linear prepolymer in conjunction with a trifunctional chain extender such as diethylene triamine. This approach has been described in U.S. Pat. Nos. 4,203,883 and 4,408,008. A problem associated with these triamine cross-linked urethanes is the very poor coalescence of the films.

A further method of introducing higher functionality is to include a triisocyanate in the prepolymer preparation but this causes the same problems of gelation and poor dispersion as when a triol is used.

A different method of incorporating triisocyanates has been described in U.S. Pat. No. 4,507,431 which describes a process for preparing aqueous dispersions of cross-linked polyurethane ionomers comprising mixing an isocyanate-containing prepolymer dissolved in a water-miscible organic solvent having a boiling point of from 20° to 100° C. with a polyfunctional polyisocyanate cross-linking compound having an isocyanate functionality of about 2.2 to 4, said isocyanate-containing prepolymer being prepared from a linear polyhydroxy compound having a molecular weight of from 800 to 5000, said prepolymer having exclusively aliphatic or cycloaliphatic terminal isocyanate groups in amounts from 0.1 to 2% by weight incorporated therein by employing an aliphatic diisocyanate and/or cycloaliphatic diisocyanate compound alone as the diisocyanate reactant with said polyhydroxy compound or in conjunction with a non-aliphatic or non-cycloaliphatic diisocyanate reactant, and containing salt groups in amounts of from 0.02 to 1% by weight; so that there are from 0.1 to 1.5 isocyanate groups of said polyisocyanate per isocyanate group of said prepolymer; dispersing the resulting solution in from 40 to 80% by weight, based on the polyurethane prepolymer and the polyisocyanate, of water and evaporating the organic solvent.

The present invention provides an aqueous dispersion of a water-dispersible polyurethane, said polyurethane comprising the reaction product of:

(a) a water-dispersible isocyanate-terminated polyurethane prepolymer having an NCO content of 2.1 to 10% by weight, (b) an organic polyisocyanate having an average isocyanate functionality of 2.1 to 4.0, and (c) an active hydrogen-containing chain extender.

In general, the water-dispersible prepolymer (a) will comprise the reaction product of (i) an organic diisocyanate;

(ii) a polyol component comprising a polymeric diol having a molecular weight in the range from 250 to 5000, and (iii) a compound containing a hydrophilic centre and at least two isocyanate or isocyanate-reactive groups.

The polyisocyanate used in making the prepolymer may be an aliphatic, cycloaliphatic, araliphatic or aromatic polyisocyanate. Examples of suitable polyisocyanates include ethylene diisocyanate, 1,6-hexamethylene diisocyanate, isophorone diisocyanate, cyclohexane-1,4-diisocyanate, 4-4'-dicyclohexylmethane diisocyanate, m- and p-tetramethylxylene diisocyanates, p-xylylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanates 5-naphthylene diisocyanate. Mixtures of polyisocyanates can be used and also polyisocyanates which have been modified by the introduction of urethane, allophanate, urea, biuret, carbodiimide, uretonimine or isocyanurate residues.

The polyol component used in the preparation of the prepolymer comprises a polymeric diol having a molecular weight in the range 250 to 5000 and may optionally also contain polymeric polyols having higher hydroxyl functionalities, for example polymeric triols, and low molecular weight diols having molecular weights in the range from 62 to 249.

The polymeric diols may be members of any of the chemical classes of polymeric diols used or proposed to be used in polyurethane formulations. In particular, they may be polyesters, polyesteramides, polyethers, polythioethers, polycarbonates, polyacetals, polyolefins or polysiloxanes. Preferred molecular weights are from 800 to 3000.

Polyester diols which may be used include hydroxyl-terminated reaction products of dihydric alcohols such as ethylene glycol, propylene glycol, diethylene glycol, neopentyl glycol, 1,4-butanediol, furan dimethanol, cyclohexane dimethanol or polyether diols, or mixtures thereof, with dicarboxylic acids or their ester-forming derivatives, for example succinic, glutaric and adipic acids or their methyl esters, phthalic anhydride or dimethyl terephthalate. Polyesters obtained by the polymerisation of lactones, for example carpolactone in conjunction with a diol may also be used. Polyesteramides may be obtained by the inclusion of amino-alcohols such as ethanolamine in polyesterification mixtures.

Polyether polyols which may be used include products obtained by the polymerisation of a cyclic oxide, for example ethylene oxide, propylene oxide or tetrahydrofuran or by the addition of one or more such oxides to difunctional initiators, for example water, ethylene glycol, propylene glycol, diethylene glycol, cyclohexane dimethanol, or Bisphenol A. Especially useful polyethers include polyoxypropylene diols, poly(oxyethylene-oxypropylene) diols obtained by the simultaneous or sequential addition of ethylene and propylene oxides to appropriate initiators and polytetramethylene ether glycols obtained by the polymerisation of tetrahydrofuran.

Polythioether diols which may be used include products obtained by condensing thiodiglycol either alone or with other glycols, dicarboxylic acids, formaldehyde, aminoalcohols or aminocarboxylic acids.

Polycarbonate diols which may be used include products obtained by reacting diols such as 1,3-propanediol, 1,4-butanediol, 1,6-hexanediol, diethylene glycol of tetraethylene glycol with diaryl carbonates, for example diphenyl carbonate, or with phosgene.

Polyacetal diols which may be used include those prepared by reacting glycol or hexanediol with formaldehyde. Suitable polyacetals may also be prepared by polymerising cyclic acetals.

Suitable polyolefin diols include hydroxy-terminated butadiene homo and copolymers.

Higher functionality polymeric polyols which may be present in the polyol component have been fully described in the prior art and include, for example, polyether triols. Diols having molecular weights from 62 to 249 which may be present in the polyol component include ethylene glycol, propylene glycol, butane diol, diethylene glycol, cyclohexane dimethanol, furan dimethanol, tripropylene glycol and tetraethylene glycol.

Compounds containing a hydrophilic site and at least two isocyanate or isocyanate-reactive groups which may be used in the preparation of the prepolymer in order to provide water-dispersibility have been fully described in the prior art and may be of the ionic, ionic precursor or nonionic type.

Compounds containing an ionic hydrophilic site and at least two isocyanate or isocyanate-reactive groups particularly include polyols and polyamines containing ionic groups which may be cationic, for example quaternary ammonium, quaternary phosphonium or ternary sulphonium salt groups, or anionic, for example salts of sulpho, sulphato, thiosulphato, phospho, phosphono, phosphato or, preferably, carboxy groups. Compounds containing ionic precursor groups are compounds which contain groups such as carboxylic acid or tertiary amino groups which may readily be converted to ionic groups by simple chemical reactions such as neutralisation or quaternisation.

Specific examples of compounds containing ionic precursor groups and two or more isocyanate-reactive groups include triethanolamine and N-methyldiethanolamine and their oxyalkylation and polyesterification products, trimethylolpropane monophosphate and monosulphate, bis-hydroxymethyl-phosphinic acid, diaminocarboxylic acids, for example, lysine, cystine and 3,5-diamino benzoic acid, 2,6-dihydroxybenzoic acid and especially dihydroxyalkanoic acids, for example 2,2-dimethylolpropionic acid.

Other useful compounds are obtained by grafting vinyl acids on to polypropylene polyols as described in U.S. Pat. No. 4460738.

For the production of ionic dispersions, the prepolymer typically contains from 1 to 5% by weight of salt forming groups.

Compounds containing a nonionic hydrophilic site and at least two isocyanate or isocyanate-reactive groups include diols and/or diisocyanates having pendent polyoxyethylene chains.

Diols having pendent polyoxyethylene chains which may be used in the preparation of the prepolymer include those described in the prior art, for example in U.S. Pat. No. 3,905,929. These diols, because of their function, may be regarded as dispersing diols. Particularly suitable dispersing diols may be obtained by reacting one mole of an organic diisocyanate in which the two isocyanate groups have different reactivities with approximately one mole of a polyethylene glycol monoether and then reacting the adduct so obtained with approximately one mole of a dialkanolamine, for example diethanolamine.

Diisocyanates having groups of different reactivity which may be used in the preparation of the dispersing diols include 2,4-toluene diisocyanate, isophorone diisocyanate and 2,4'-diphenylmethane diisocyanate. Polyethylene glycol monoethers which may be used include the reaction products of ethylene oxide with monohydric alcohols such as methanol, ethanol, tertiary butanol or benzyl alcohol or phenols such as phenol itself. The polyethylene glycol monoethers suitably have molecular weights in the range 250 to 3000 and preferably in the range 500 to 2000.

If desired, the polyoxyethylene chains may contain units of other alkylene oxides in addition to the ethylene oxide units. Thus, polyoxyalkylene chains in which up to 60% of the alkylene oxide units are propylene oxide units, the remainder being ethylene oxide units, may be used.

The preparation of the dispersing diols may be achieved by adding the polyethylene glycol monoether to the diisocyanate at 20°–50° C., optionally in the presence of an inert solvent and a urethane catalyst, followed by addition of the dialkanolamine.

Diisocyanates having pendent polyoxyethylene chains which may be used in the preparation of the prepolymer include those described in the prior art, for example in U.S. Pat. No. 3,920,598. These diisocyanates, because of their function, may be regarded as dispersing diisocyanates. Particularly suitable dispersing diisocyanates may be obtained by reacting two moles of an organic diisocyanate in which the two isocyanate groups have different reactivities with approximately one mole of a polyethylene glycol monoether, the initially formed urethane monoisocyanate then reacting at a higher temperature with the excess diisocyanate to form an allophanate diisocyanate having a pendent polyoxyethylene chain.

Suitable diisocyanates and polyethylene glycol monoethers for use in preparing the dispersing diisocyanates have been mentioned above for the preparation of the dispersing diols.

For non-ionic polyurethanes, a polyoxyethylene content of from 2 to 30% by weight is generally suitable.

The water-dispersible isocyanate-terminated prepolymer may be prepared in conventional manner by reacting a stoichiometric excess of the organic polyisocyanate with the polyol component and the compound containing a hydrophilic site under substantially anhydrous conditions at a temperature between about 30° and about 130° C., especially 50° to 90° C., until reaction between the isocyanate groups and the isocyanate-reactive groups is substantially complete. The polyisocyanate, polyol component and hydrophilic compound are suitably reacted in such proportions that the initial ratio of number of isocyanate groups to number of isocyanate-reactive groups is in the range from about 1.2:1 to about 3:1, preferably from 1.4:1 to 2.2:1, to give a prepolymer having an NCO content in the range from 2.1 to 10% by weight. If desired, catalysts for urethane formation such as dibutyltin dilaurate and stannous octoate may be used to assist prepolymer formation and a non-reactive solvent may be added before or after prepolymer formation to control the viscosity. Suitable solvents which may be used include acetone, methyl ethyl ketone, dimethyl ethylene urea, dimethylformamide, ethylene carbonate, propylene carbonate, diglyme, N-methylpyrrolidone, ethyl acetate, ethylene and propylene glycol diacetates, alkyl ethers of ethylene and propylene glycol monoacetates, toluene, xylene and sterically hindered alcohols such as t-butanol and diacetone alcohol. The preferred solvents are water-miscible solvents such as N-methylpyrrolidone, dimethyl sulphoxide and dialkyl ethers of glycol acetates or mixtures of N-methylpyrrolidone and methyl ethyl ketone. Other suitable solvents include vinyl monomers which can be subsequently polymerised. Suitable amounts of solvent vary from 1 to 40% based on the weight of prepolymer.

Organic polyisocyanates having average isocyanate functionalities of 2.1 to 4.0 which may be used in preparing the dispersions of the invention include the trimers of hexamethylene diisocyanate, isophorone diisocyanate and 2,4-toluene diisocyanate, biuret-modified hexamethylene diisocyanate, the adduct of 2,4-toluene diisocyanate and trimethylolpropane, the adduct of m- or p-tetramethylxylene diisocyanate and trimethylolpropane and mixtures of diphenylmethane diisocyanate and polymethylene polyphenyl polyisocyanates.

The polyisocyanate having an average isocyanate functionality of 2.1 to 4.0, preferably 2.2 to 3.0, may be added to the isocyanate-terminated polyurethane prepolymer after prepolymer formation is complete. Suitable amounts to add are generally such as to provide from 0.1 to 2.75 isocyanate groups from the higher functionality polyisocyanate per isocyanate group of the prepolymer.

The aqueous dispersions of the invention may be prepared by dispersing the mixture of water-dispersible isocyanate-terminated polyurethane prepolymer and higher functionality polyisocyanate in an aqueous medium and effecting chain extension with an active hydrogen-containing chain extender.

The prepolymer may be dispersed in water using techniques well known in the art. Preferably, the prepolymer is added to the water with agitation or, alternatively, water may be stirred into the prepolymer.

Conversion of any ionic precursor groups, for example carboxy groups, in the prepolymer to ionic (salt) groups may be effected before, simultaneously with, or after the addition of the prepolymer to water. The agent used to effect neutralisation of a carboxy group may suitably be ammonia or a tertiary amine such as triethylamine, triethanolamine or N-methylmorpholine.

The active hydrogen containing chain extender which is reacted with the prepolymer is suitably a polyol, an amino alcohol, ammonia, a primary or secondary aliphatic, alicyclic, aromatic, araliphatic or heterocyclic amine especially a diamine, hydrazine or a substituted hydrazine. Water-soluble chain extenders are preferred, and water itself may be effective.

Examples of suitable chain extenders useful herein include ethylene diamine, diethylene triamine, triethylene tetramine, propylene diamine, butylene diamine, hexamethylene diamine, cyclohexylene diamine, piperazine, 2-methyl piperazine, phenylene diamine, tolylene diamine, xylylene diamine, tris(2-aminoethyl) amine, 3,3'-dinitrobenzidine, cystine, 4,4'-methylenebis(2-chloroaniline), 3,3'-dichloro-4,4'bi-phenyl diamine, diaminosilanes, 2,6-diaminopyridine, 4,4'-diaminodiphenylmethane, menthane diamine, m-xylene diamine and isophorone diamine. Also materials such as hydrazine, azines such as acetone azine, substituted hydrazines such as, for example, dimethyl hydrazine, 1,6-hexamethylene-bis-hydrazine, carbodihydrazine, hydrazides of dicarboxylic acids and sulfonic acids such as adipic acid mono- or dihydrazide, oxalic acid dihydrazide, isophthalic acid dihyrazide, tartaric acid dihydrazide, 1,3-phenylene disulfonic acid dihydrazide, omega-amino-caproic acid dihydrazide, hydrazides made by reacting lactones with hydrazine such as gamma-hydroxylbutyric hydrazide, bis-semi-carbazide, bis-hydrazide carbonic esters of glycols such as any of the glycols mentioned above.

Where the chain extender is other than water, for example a diamine or hydrazine, it may be added to the aqueous dispersion of prepolymer or, alternatively, it may already be present in the aqueous medium when the prepolymer is dispersed therein.

The chain extension can be conducted at elevated, reduced or ambient temperatures. Convenient temperatures are from about 5° to 95° C. or more, preferably from about 10° to about 45° C.

The amount of chain extender employed should be approximately equivalent to the free NCO groups in the prepolymer, the ratio of active hydrogens in the chain extender to NCO groups in the prepolymer preferably being in the range from 1.0 to 2.0:1. Of course, when water is employed as the chain extender, these ratios will not be applicable since the water, functioning both as chain extender and dispersing medium, will be present in gross excess relative to the free-NCO groups.

The aqueous dispersions of the invention may be advantageously employed as coating compositions, for which purpose they may be further diluted with water and/or organic solvents, or they may be supplied in more concentrated form by evaporation of water and/or organic components of the liquid medium. As coating compositions, they may be applied to any substrate including wood, metals, glass, cloth, leather, paper, plastics, foam and the like, by any conventional method including brushing, dipping, flow coating, spraying, and the like. The compositions may contain other conventional ingredients including organic solvents, pigments, dyes, emulsifiers, surfactants, thickeners, heat stabilizers, levelling agents, anti-cratering agents, fillers, sedimentation inhibitors, UV absorbers, antioxidants and the like introduced at any stage of the production process or subsequently. It is possible to include an amount of an antimony oxide in the dispersions to enhance the fire retardant properties. The compositions are characterised by improved adhesion to most substrates and are of especial value for providing a soft feel to imitation leather.

The dispersions may also be used as adhesives for materials such as polypropylene, polyester, polyurethane, leather and the like or as binding agents for various particulate materials.

The dispersions suitably have solids contents of from about 20 to 60% by weight.

If desired, the polyurethane dispersions of the invention may be used in admixture with other dispersions, for example dispersions of vinyl polymers and copolymers.

Thus, in a further aspect of the invention, there is provided an aqueous polymer dispersion containing a water-dispersible polyurethane and a vinyl polymer, the polyurethane being the product of reacting (a) a water-dispersible, isocyanate-terminated polyurethane prepolymer having an NCO content of 2.1 to 10% by weight (b) an organic polyisocyanate having an average isocyanate functionality of 2.1 to 4.0, and (c) an active hydrogen containing chain extender.

The aqueous polymer dispersions may be prepared by simply blending an aqueous dispersion of a water-dispersible polyurethane as described above with an aqueous dispersion of a vinyl polymer. It is especially preferred, however, to polymerise one or more vinyl monomers in the presence of the aqueous polyurethane dispersion. This may be effected by adding the vinyl monomer or monomers to the polyurethane dispersion, either gradually or all at once, and subjecting the monomer to polymerisation conditions during and/or after its addition to the dispersion. Alternatively, a solution of prepolymer in vinyl monomer may be dispersed in an aqueous medium after which the prepolymer is chain extended and the vinyl monomer polymerised.

Vinyl monomers which may be polymerised to form the vinyl polymer component of the aqueous dispersions of the invention include any radically polymerisable olefinically unsaturated compounds or mixtures thereof. Thus, there may be mentioned hydrocarbon monomers, for example butadiene, isoprene, styrene and divinyl benzene, acrylic and substituted acrylic monomers, for example acrylic and methacrylic acids, acrylonitrile, methyl, ethyl, 2-hydroxyethyl, butyl and isobutyl acrylates and methacrylates, acrylamide, methacrylamide, N-methylolacrylamide and other commonly used monomers such as vinyl chloride, vinylidene chloride, vinyl esters, vinyl ethers, vinyl ketones and heterocyclic vinyl compounds.

Polymerisation of the vinyl monomer or monomers may be effected using conventional polymerisation techniques. Thus, the monomer may be contacted with free radical initiators, for example organic phase initiators such as azodiisobutyronitrile or initiators partitioned between the aqueous and organic phases, for example a combination of t-butylhydroperoxide, isoascorbic acid and Fe.EDTA or water-soluble initiators such as persulphates.

The weight ratio of polyurethane to vinyl polymer in the dispersions of the invention is suitably in the range from 90:10 to 10:90, preferably from 80:20 to 20:80, with a solids content in the range from about 30% to about 55% by weight. Viscosities are usually between 20 and 1000 cps at 25° C.

The aqueous polymer dispersions containing vinyl polymer may be utilised for purposes similar to those described for the unmodified polyurethane dispersions. Thus, they may be used as coating compositions, adhesives, binding agents and the like.

The invention is illustrated but not limited by the following Examples:

EXAMPLE 1

Into a 3000 ml resins reactor equipped with stirrer, heating mantle, thermometer and nitrogen are charged 1500 g (1.516 eq.) of an ethylene adipate diol, 112.2 g (1.674 eq.) of dimethylol propionic acid, 663.6 g (5.065 q.) of bis-(cyclohexyl) methane diisocyanate, 570 g of N-methyl-2-pyrrolidinone and 2.4 g of dibutyl tin dilaurate. The system is stirred and heated to 80° C. for two hours. The reactor is cooled to 60° C. and 84.6 g of triethylamine and 415 g (2.29 eq.) of DesN-100 (biuret of hexane diisocyanate) are added. 3000 g of the prepolymer mixture is poured into 5183 g of water containing 30 g of a nonionic nonyl phenol surfactant Triton X-305. The water temperature is maintained at 20°-30° C. during the addition of prepolymer. Five minutes after the addition is complete 88.4 g of 64% hydrazine is added which results in a 10° C. exotherm. The final product has a viscosity of 17 cps, pH=8.07, solids=30.2%.

EXAMPLES 2-4

An isophorone diisocyanate terminated prepolymer was prepared in a similar manner to Example 1 except the following amounts were used.

|  | Example 2 | Example 3 | Example 4 |
|---|---|---|---|
| Polytetramethylene diol (mw = 2000) | 454 | 454 | 454 |
| Dimethylol propionic acid | 36.9 | 36.9 | 36.9 |
| Isophorone diisocyanate | 167 | 167 | 167 |
| Dibutyl tin dilaurate | 0.5 | 0.5 | 0.5 |
| N-Methyl-2-pyrrolidinone | 164 | 164 | 164 |
| DesN-3200* | 123 | 165.0 | 34.6 |
| Triethylamine | 27.8 | 27.8 | 27.8 |
| 64% Hydrazine | 28.6 | 34.2 | 16.7 |
| Water | 1413 | 2095 | 1112 |
| pH | 7.68 | 7.62 | 8.0 |
| Viscosity cps | 1170 | 1080 | 305 |
| Solids | 33.2 | 27 | 35 |

*Biuret of hexane diisocyanate

EXAMPLE 5

A 1000 ml reactor equipped with stirrer, thermometer, heating mantle, and nitrogen was charged with 240 g (0.24 eq.) of an ethylene adipate diol, 24.1 g (0.36 eq.) of dimethylol propionic acid, 95 g of N-methyl-2-pyrrolidone and 78.6 g (0.90 eq.) of an 80:20 mixture of 2,4:2,6-toluene diisocyanate. The system was allowed to exotherm to 50° C. then was held there for two hours.

Afterwards, 40.3 g (0.22 eq.) of DesN-100 was added and mixed with the prepolymer until a homogeneous solution formed. 400 g of this prepolymer mixture was dispersed into a water solution containing 19.0 g of triethylamine, 4.0 g of N-95 (ethoxylated nonyl phenol surfactant) 10.2 g of 64% hydrazine and 716 g of water.

The dispersion has a solids content of 28%, pH of 7.9 and viscosity of 350 cps.

EXAMPLE 6

Into a 500 ml reactor was charged 200 g (0.2 eq.) of an ethylene adipate diol, 20.1 g (0.30 eq.) of dimethylol propionic acid, 118 g (0.90 eq.) of bis-(cyclohexyl) methane diisocyanate, 85 g of methyl methacrylate and 0.5 g of dibutyl tin dilaurate. The reactor was warmed to 85° C. for a period of three hours until the free isocyanate content dropped to 3.74% (92% of theory). The reactor was cooled to 60° C. and 15.2 g of triethylamine and 23.0 g of the prepolymer was dispersed into 380 g of water containing 3 g of Triton X-305 (ethoxylated nonylphenol surfactant). After the dispersion was completed, 7.91 g of 64% hydrazine was added to extend the urethane prepolymer.

The methyl methacrylate was polymerized by warming the dispersion to 35° C. (under nitrogen) and adding 9.1 g of 3.5% ter-butylhydroperoxide, 0.1 g of triethylene tetramine, 1.76 g of a 1% solution of the adduct of iron sulfate and the tetrasodium salt of ethylene diamine tetraacetic acid and 10.1 g of a 1% solution of erythorbic acid neutralized with triethylamine. The dispersion exothermed 5° C. and was held at 40° C. for one hour. The urethane-acrylic copolymer dispersion had a solids content of 41.0%, pH of 8.2, and viscosity of 150 cps.

EXAMPLE 7-11

Example 7 is a comparative example and contains no cross-linker. Examples 7-11 were prepared similar to Example 1 except the following amounts were used:

|  | Ex 7 | Ex 8 | Ex 9 | Ex 10 | Ex 11 |
|---|---|---|---|---|---|
| Ethylene adipate diol (mw = 2000) | 450 | 450 | 450 | 450 | 450 |
| Dimethylol propionic acid | 36.8 | 36.8 | 36.8 | 36.8 | 36.8 |
| bis-(cyclohexyl)methane diisocyanate | 196.5 | 196.5 | 196.5 | 196.5 | 196.5 |
| N-Methyl-2-pyrrolidinone | 170 | 170 | 170 | 170 | 170 |
| Dibutyl tin dilaurate | 0.8 | 0.8 | 0.8 | 0.8 | 0.8 |
| DesN-100 | — | 35.9 | 75.9 | 120.6 | 170 |
| Triethylamine | 27.7 | 27.7 | 27.7 | 27.7 | 27.7 |
| Triton X-305 | 8.5 | 8.5 | 8.5 | 8.5 | 8.5 |
| Water | 1441 | 1493 | 1593 | 1652 | 2140 |
| Hydrazine 64% | 11.8 | 16.4 | 21.6 | 27.3 | 33.6 |
| pH | 7.87 | 7.9 | 7.82 | 7.85 | 7.9 |
| Viscosity cps | 26 | 27 | 27 | 280 | 550 |
| solids % | 31.2 | 30.4 | 30.4 | 31.0 | 29 |
| Tensile psi | 3400 | 3600 | 3726 | 4080 | 3900 |
| Elongation % | 1015 | 650 | 630 | 445 | 280 |
| 100% Mod. psi | 320 | 1100 | 1500 | 2000 | 2600 |
| Koneig Hardness | 25 | 30 | 40 | 45 | 54 |

EXAMPLES 12—13 (COMPARATIVE EXAMPLES)

Examples 12 and 13 were both prepared from the same prepolymer except that Example 12 contains no triisocyanate cross-linker and was extended with diethylene triamine, while Example 13 contains triisocyanate and was extended with hydrazine.

|  | Example 12 | Example 13 |
|---|---|---|
| Ethylene adipate diol m.w. 2000 | 450 | 450 |
| Dimethylol propionic acid | 33.7 | 33.7 |
| N-Methyl-2-pyrrolidinone | 171 | 171 |
| Dibutyl tin dilaurate | 1.0 | 1.0 |
| bis-(cyclohexyl) methane diisocyanate | 199 | 199 |
| Triethylamine | 25.4 | 25.4 |
| DesN-100 | 0 | 120.5 |
| Triton X-305 | 6.0 | 6.8 |
| Hydrazine 64% | — | 27.3 |
| Diethylene triamine | 16.3 | — |
| Water | 1425 | 1565 |
| Solids % | 30.1 | 30.3 |
| pH | 8.21 | 7.78 |
| Viscosity cps | 13.0 | 13.0 |

EXAMPLE 14

The following reactants were used to prepare a nonionically stabilized cross-linked urethane. The nonionic dispersing diol was prepared by reacting isophorone diisocyanate with methoxy polyoxyethylene (mw=750) then with diethanol amine in the presence of 13% methyl ethylketone. The amounts used are listed below:

| Polytetramethylene glycol (mw = 250) | 116 |
|---|---|
| Dispersing diol (87% solids) in MEK | 127.4 |
| Methyl ethyl ketone | 84.8 |
| N-Methyl-2-pyrrolidinone | 102 |
| Dimethylol propionic acid | 13 |
| Isophorone diisocyanate | 237.6 |
| Hydrazine (64%) | 18.9 |
| DesN-100 | 13.7 |
| Water | 594 |
| Dibutyl tin dilaurate | 0.9 |
| Solid % | 35.4 |
| pH | 5.4 |
| Viscosity cps | 63 |

EXMAPLE 15

This Example shows that to obtain low viscosity prepolymers, the triisocyanate cross-linker must be added at the end of the prepolymer cook. The prepolymer was prepared similar to Example 1 except the following amounts were used;

| Ethylene adipate diol (mw = 2000) | 400 |
|---|---|
| Dimethylol propionic acid | 40.2 |
| bis-(cyclohexyl) methane diisocyanate | 196.5 |
| DesN-100 | 165 |
| Dibutyl tin dilaurate | 1.0 |
| N-Methyl-2-Pyrrolidinone | 201 |

The system was heated to 80° C. for a period of two hours until the prepolymer became very thick and gelled.

EXAMPLE 16

Into a 1000 ml reactor equipped with thermometer, stirrer and nitrogen, was placed 143 g of a polytetramethylene diol (1000 mw), 20.4 g of cyclohexane dimethanol, 28.9 g of dimethylol propionic acid, 127.6 g N-Methyl-2-pyrrolidinone, 25.5 g of methyl ethyl ketone. To this solution was added a mixture of 96.5 g of an 80:20 mixture of 4,4':2,4'-methylene diphenyl-diisocyanate with 67.6 g of an 80:20 mixture of 2,4:2.6;toluene diisocyanate. After the components were mixed, the reaction was allowed to exotherm to 60° C. and held there for two hours. After the reaction was completed, a solution of 100 g of the adduct of trimethylol propane and 2,4-toluene diisocyanate (1:3) dissolved in xylene (60%) was added. 250 g of the prepolymer mixture was dispersed into 276 g of water containing 26.8 g of 16% hydrazine and 9.8 g of triethylamine. The dispersion had a solids content of 34.2%, pH 7.66 and viscosity of 40 cps.

EXAMPLE 17

|  | Ex 1 | Ex 2 | Ex 3 | Ex 6 | Ex 7 | Ex 8 | Ex 9 | Ex 10 | Ex 11 | Ex 12 | Ex 13 |
|---|---|---|---|---|---|---|---|---|---|---|---|
| 7 Day Humid Age 104° F. 100% R.H. | N.E. | N.E. | N.E. | N.E. | W.R.B* | N.E. | N.E. | N.E. | N.E. | W.R. | N.E. |
| Tensile psi | 3903 | 973 | 1094 | 3750 | 3400 | 3600 | 3726 | 4080 | 3900 | | |
| Modulus 100% psi | 1873 | — | — | 2000 | 320 | 1100 | 1500 | 2000 | 2600 | | |
| Elongation % | 552 | 95 | 50 | 620 | 1015 | 650 | 630 | 445 | 280 | | |
| Koneig Hard. | 57 | 34 | 33 | 55 | 25 | 30 | 40 | 45 | 54 | 35 | 53 |
| Chemical Resis. | | | | | | | | | | | |
| Toluene | 10 | 10 | 10 | 10 | 9 | 10 | 10 | 10 | 10 | 9 | 10 |
| Isopropyl Alcohol | 10 | 9 | 8 | 10 | 6 | 9 | 10 | 10 | 10 | 9 | 10 |
| Methyl Ethyl Ketone | 10 | 9 | 8 | 9 | 8 | 8 | 9 | 9 | 10 | 8 | 9 |
| Calculated Molecular Weight per crosslink | 3650 | 3528 | 2780 | 11037 | | 11454 | 5727 | 3818 | 2864 | 4416 | 3818 |

*w = Whitened  B = Blisters  R = Rusted

We claim:

1. An aqueous dispersion of a water-dispersible polyurethane, said polyurethane comprising the reaction product of:
   (a) a water-dispersible isocyanate-terminated polyurethane prepolymer having an NCO content of 2.1 to 10% by weight,
   (b) an organic polyisocyanate having an average isocyanate functionality of 2.1 to 4.0, and
   (c) an active hydrogen-containing chain extender, said aqueous dispersion of the polyurethane being prepared by dispersing the water-dispersible polyurethane prepolymer and polyisocyanate of average functionality 2.1 to 4.0 in an aqueous medium in the absence of proceeding through the steps of dissolving said prepolymer and polyisocyanate in a water-miscible solvent of boiling point 20° to 100° C. admixing with water, and removing said water-miscible solvent, and effeting chain-extension in the aqueous medium to form said aqueous polyurethane dispersion usign the active hydrogen-containing chain extender.

2. An aqueous dispersion according to claim 1 wherein the water-dispersible prepolymer comprises the reaction product of
   (i) an organic diisocyanate;
   (ii) a polyol component comprising a polymeric diol having a molecular weight in the range from 250 to 5000, and
   (iii) a compound containing a hydrophilic site and at least two isocyanate or isocyanate-reactive groups.

3. An aqueous dispersion according to claim 2 wherein the compound containing a hydrophilic site and at least two isocyanate or isocyanate-reactive groups is a dihydroxyalkanoic acid.

4. An aqueous dispersion according to claim 3 wherein the dihydroxyalkanoic acid is 2,2-dimethylolpropionic acid.

5. An aqueous dispersion according to claim 2 wherein the compound combining a hydrophilic site and at least two isocyanate or isocyanate-reactive groups is a diol having a pendent polyoxyethylene chain.

6. An aqueous dispersion according to claim 5 wherein the diol having a pendent polyoxyethylene chain is a product obtained by reacting one mole of an organic diisocyanate in which the two isocyanate groups have different reactivities with approximately one mole of a polyethylene glycol mono-ether and then reacting the adduct so obtained with approximately one mole of a dialkanolamine.

7. An aqueous dispersion according to any preceding claim wherein the organic polyisocyanate having an average isocyanate functionality of 2.1 to 4.0 in the biuret of hexamethylene diisocyanate.

8. An aqueous dispersion according to any preceding claim containing a vinyl polymer.

9. Method for the production of an aqueous dispersion of a water-dispersible polyurethane, wherein there is formed a polyurethane comprising teh reaction product of:
   (a) a water-dispersible isocyanate-terminated polyurethane prepolymer having an NCO content of 2.1 to 10% by weight,
   (b) an organic polyisocyanate having an average isocyanate functionality of 2.1 to 4.0, and
   (c) an active hydrogen-containing chain extender, and wherein said aqueous dispersion of the polyurethane is prepared by dispersing the water-dispersible polyurethane prepolymer and polyisocyanate of average functionality 2.1 to 4. 0in an aqueous medium in the absence of proceeding through the steps of dissolving said prepolymer and polyisocyanate in a water-miscible solvent of boiling point 20° to 100° C. admixing with water, and removing said water-miscible solvent, and effecting chain-extension in the aqueous medium to form said aqueous polyurethane dispersion using the active hydrogen-containing chain extender.

* * * * *